United States Patent [19]

Simpson et al.

[11] Patent Number: 5,622,605
[45] Date of Patent: *Apr. 22, 1997

[54] PROCESS FOR DESALINATING WATER WHILE PRODUCING POWER

[76] Inventors: Gary D. Simpson, 15434 Tadworth Dr., Houston, Tex. 77062; Karl Lin, 13131 Fallsview La., No. 725, Houston, Tex. 77077

[*] Notice: The term of this patent shall not extend beyond the expiration date of Pat. No. 5,405,503.

[21] Appl. No.: 419,023

[22] Filed: Apr. 10, 1995

Related U.S. Application Data

[63] Continuation-in-part of Ser. No. 147,884, Nov. 5, 1993, Pat. No. 5,405,503.

[51] Int. Cl.$^6$ .................. B01D 3/34; C02F 1/04; C02F 1/42
[52] U.S. Cl. .................. 203/10; 60/648; 60/676; 159/DIG. 39; 203/4; 203/7; 203/23; 203/40; 203/71; 203/DIG. 8; 203/DIG. 17; 203/DIG. 20; 210/687; 210/673
[58] Field of Search .................. 203/10, 43, DIG. 17, 203/DIG. 16, DIG. 20, 42, 7, 4, 34, 23, 40, DIG. 8, 71, 27, 2, 21; 210/673, 664, 670, 687, 666; 202/176, 197; 60/648, 676; 159/DIG. 39, 16.1; 95/241, 251

[56] References Cited

U.S. PATENT DOCUMENTS

| | | | |
|---|---|---|---|
| 1,818,996 | 8/1931 | Marshall | 60/676 |
| 3,367,845 | 2/1968 | Coit et al. | 203/DIG. 17 |
| 3,476,653 | 11/1969 | Doland | 203/DIG. 20 |
| 3,489,652 | 1/1970 | Williamson | 203/DIG. 20 |
| 3,557,863 | 1/1971 | Becker | 203/49 |
| 3,950,949 | 4/1976 | Martin et al. | 60/676 |
| 4,094,747 | 6/1978 | Pfenninger | 60/648 |
| 4,328,675 | 5/1982 | Pocrnja et al. | 60/676 |
| 4,347,704 | 9/1982 | Marquardt et al. | 203/DIG. 20 |
| 4,392,959 | 7/1983 | Coillet | 210/651 |
| 4,522,728 | 6/1985 | Gallup et al. | 60/641.5 |
| 4,770,790 | 9/1988 | Oberhofer | 210/673 |
| 5,181,381 | 1/1993 | Gounder | 60/676 |

FOREIGN PATENT DOCUMENTS

| | | | |
|---|---|---|---|
| 0165066 | 4/1922 | United Kingdom | 60/676 |
| 0727659 | 4/1955 | United Kingdom | 60/676 |

*Primary Examiner*—Virginia Manoharan
*Attorney, Agent, or Firm*—Kenneth A. Roddy

[57] ABSTRACT

A process and apparatus for desalinating seawater or brine and purifying water which contains minerals, salts, and other dissolved solids while simultaneously generating power. The salinous water is heated in a boiler to form steam and a concentrated brine. The concentrated brine is removed from the boiler, the steam produced in the boiler is washed with fresh water to remove trace salts and inorganic materials, and water bearing trace salts and inorganic materials are returned to the boiler. The washed steam is expanded across a turbine to generate electrical or mechanical power which is utilized as a product. The steam exhausted from the turbine is collected and condensed, and one portion of the condensed water is utilized as a fresh water product and another portion of the condensed water is used as the wash water to wash the steam produced in the boiler. Energy efficiency is improved by heat exchanging the hot concentrated brine against the salinous feed water or by flashing the brine to produce steam. Boiler scaling and corrosion may be controlled by feed water pretreatment. By utilizing distillation combined with power generation, demand for fresh water and power can be satisfied simultaneously. Efficiency is further improved by utilizing a low pressure boiler at lower temperatures for desalination in conjunction with a high pressure boiler for producing power.

24 Claims, 5 Drawing Sheets

PROCESS FOR DESALINATING WATER WHILE PRODUCING POWER

CROSS REFERENCE TO RELATED APPLICATION

This application is a continuation-in-part of U.S. patent application Ser. No. 08/147,884 filed Nov. 5, 1993, now U.S. Pat. No. 5,405,503.

BACKGROUND OF THE INVENTION

1. Field of the Invention

This invention relates generally to desalinating processes, and more particularly to a process for desalinating seawater or brine or purifying fresh containing minerals, salts, and other dissolved solids while simultaneously generating power. Efficiency is improved by utilizing a low pressure boiler at lower temperatures for desalination in conjunction with a high pressure boiler for producing power.

2. Brief Description of the Prior Art

As world population increases, demand for fresh water and power will also increase. Pollutants and drought result in a shortage of fresh water in many locations. Therefore, it would be desirable to provide a process utilizing desalination and distillation combined with power generation whereby demand for fresh water and power can be simultaneously satisfied.

Most previous methods of desalination have been stand-alone processes. Hence, they have focused upon energy efficiency to satisfy economics. Several of the commercial methods include reverse osmosis, evaporation, and vapor recompression. Dual purpose power plants have also been utilized.

Reverse osmosis is a technology wherein fresh water is extracted from saline water by pressure. This is accomplished by circulating saline water under high pressure (i.e., 1000–2000 psig) around a loop. One portion of the loop is adjacent to a membrane. The membrane selectively allows water to pass through it while preventing the passage of most ions. Effectively, fresh water is squeezed from the saline water. Excellent energy efficiency can be achieved by this method. However, the membranes are prone to pluggage and in practice the fresh water produced is not completely free of dissolved salts. The present process, on the other hand, produces fresh water by a phase change and produces power.

Evaporation is the boiling of salinous water by the addition of heat followed by the condensation of the steam by heat exchange. Evaporators may be classified as boiling or flashing. No work is performed by the system and a large amount of energy input is required. This method is the least energy efficient of the existing methods. The present process, on the other hand, performs work and partial condensation of the steam may be accomplished by doing the work.

Vapor recompression is a technology wherein water boils itself. This is accomplished by boiling water at low pressure to produce water vapor. The water vapor is compressed and heated by doing work upon it. The heated water vapor is then condensed by heat exchange against the boiling water. The net result is that a phase change is accomplished by doing work. The energy efficiency of the system is controlled by the amount of heating of the water vapor. Small temperature increases result in high energy efficiencies and hence low operating costs for energy. Unfortunately, small temperature increases also result in large amounts of heat exchange area and hence high capital outlays. The present process, on the other hand, requires less heat exchanger area for a given duty and condensation may be at least partially achieved by doing work. With the present system, work is withdrawn from the system rather than input into the system.

Dual purpose desalination/power plants currently in use produce fresh water by using the exhaust steam as a source of heat for an evaporator. The exhaust steam is condensed against the boiler of the evaporator. As the boiler duty increases with fresh water production, the temperature of the condensing exhaust steam also increases. This reduces the thermodynamic efficiency of the power plant providing the steam. In the present process efficiency of the power plant is not adversely affected by increasing the fresh water production rate.

Power generation using steam expansion is a common process. Condensate is fed to a boiler and heated. Steam is removed from the boiler and typically superheated. It then expands across a turbine, thereby doing work. The steam is then condensed and recycled to the boiler. A moderate amount of liquid is intermittently withdrawn from the boiler to prevent sludge accumulation. Treated fresh water is added to the system to compensate for material losses. The present process, on the other hand, withdraws the condensate as a product. Also, treated salinous water is fed to the boiler and liquid is continuously removed from the boiler to reduce scaling and prevent supersaturation by salt. In addition, the steam produced is washed by a stream of condensate to remove volatized salts and other inorganic compounds such as silica. Efficiency is further improved by utilizing a low pressure boiler at lower temperatures for desalination in conjunction with a high pressure boiler for producing power.

There are several patents which disclose various desalinating processes, some of which also generate power.

Ellis et al, U.S. Patent discloses a process which utilizes geothermal brine to generate power in a closed system with the exclusion of air to minimize corrosion. Steam from geothermal brine contains significant quantities of soluble salts including sodium and potassium chloride, calcium salts and iron and manganese salts, which have a strong corrosive action on turbine blades and related equipment. In this process, hot geothermal brine is flashed in a flash zone to form steam and concentrated brine and the steam is used to drive a power-generating turbine. The exhaust steam from the turbine is condensed and the major portion of the condensed steam is combined with the concentrated brine to form a restored brine, and the restored brine is returned to the geothermal hot brine well. There is no suggestion of a fresh water product.

Kutchinson et al, U.S. Pat. No. 3,893,299 discloses a geothermal heat recovery process wherein hot water from a geothermal well is passed through successive flash chambers operating at successively lower temperatures and the steam from each flash chamber is passed in heat exchange relationship with a working fluid operating in a closed loop which is expanded in a power extracting gas expansion device for generating power. The hot fluid at the output of each heat exchange is either combined with the steam at the output of the next flash chamber or applied to the input of the next flash chamber with the hot fluid that is not converted to steam. There is no suggestion of a fresh water product.

Spears, Jr., U.S. Pat. No. 4,078,976 discloses a potable recovery and power generating process which utilizes solar power for recovering potable water from salinous water. A portion of salinous water and an air stream are introduced into a solar radiation heat sink and heated water-containing air is withdrawn and condensed into potable drinking water.

The heated salinous water is withdrawn from the solar radiation heat sink and recycled, and a part of the heated salinous water is flashed and the resultant vapor is passed through turbines to generate power and the exiting turbine vapors are cooled or condensed by contact with a second portion of the salinous water to recover addition potable water.

Pitcher, U.S. Pat. No. 4,267,022 and Gress, U.S. Pat. No. 4,310,382 disclose processes which utilize air as a working fluid for desalination and heat pumps for transferring latent heat associated with vaporizing or condensing water from one part of the process to another. Both processes require work input rather than producing work.

Mock, U.S. Pat. No. 4,276,124 and Elmore, U.S. Pat. No. 5,096,543 are essentially low-efficiency evaporator systems which utilize air as a working fluid to transport water vapor from one part of the system to another.

Becker, U.S. Pat. No. 3,557,863 discloses a process for obtaining fresh water from saline water by injecting saline water through nozzles into a hot high pressure gas directed into an evaporation chamber to evaporate the saline water and generate a gas-vapor mixture and a precipitate. The gas-vapor mixture and the precipitate are separately withdrawn from the chamber. The gas-vapor mixture is engine expanded and then cooled to condense out fresh water. Becker teaches away from the use of heated metallic heat exchanger surfaces and teaches away from introducing fresh wash water into the steam to wash the steam such that it is substantially free of trace salts, minerals, and dissolved solids, and then expanding washed steam across the turbine.

Williamson, U.S. Pat. No. 3,489,652 teaches indirect contact of the saline water with the heat source in a heat exchanger at the first part of the process and then flash evaporating the saline water in successive stages in a multi-stage flash evaporator to produce a vapor fraction and a brine fraction in each stage and the brine is finally discharged as waste. Williamson does not use a wash column, and the multi-stage evaporation process lowers the temperature of the steam that reaches the turbine which lowers the efficiency of the turbine.

The present invention is distinguished over the prior art in general, and these patents in particular by a process and apparatus for desalinating seawater or brine and purifying water containing minerals, salts, and other dissolved solids while simultaneously generating power. The salinous water is heated in a boiler to form steam and a concentrated brine. The concentrated brine is removed from the boiler, the steam produced in the boiler is washed with fresh water to remove trace salts and inorganic materials, and water bearing trace salts and inorganic materials are returned to the boiler. The washed steam is expanded across a turbine to generate electrical or mechanical power which is utilized as a product. The steam exhausted from the turbine is collected and condensed, and one portion of the condensed water is utilized as a fresh water product and another portion of the condensed water is used as the wash water to wash the steam produced in the boiler. Energy efficiency is improved by heat exchanging the hot concentrated brine against the salinous feed water or by flashing the brine to produce steam. Boiler scaling and corrosion may be controlled by feed water pretreatment. By utilizing distillation combined with power generation, demand for fresh water and power can be satisfied simultaneously. Efficiency is further improved by utilizing a low pressure boiler at lower temperatures for desalination in conjunction with a high pressure boiler for producing power.

SUMMARY OF THE INVENTION

It is therefore an object of the present invention to provide a process for desalinating seawater or brine and/or purifying fresh water which contains minerals, salts, and other dissolved solids while simultaneously generating power.

It is another object of this invention to provide a process for desalination and distillation combined with power generation whereby demand for fresh water and power can be simultaneously satisfied.

Another object of this invention is to provide a process for desalinating seawater or brine and/or purifying water containing minerals, salts, and other dissolved solids, which overcomes the obstacles of corrosion, scaling, and steam contamination normally associated with the production of power from steam.

Another object of this invention is to provide a process for desalinating seawater or brine and/or purifying water containing minerals, salts, and other dissolved solids, which is energy efficient and performs work and wherein partial condensation of the steam is accomplished by doing the work.

Another object of this invention is to provide a process for desalinating seawater or brine and/or purifying water containing minerals, salts, and other dissolved solids, which allows reduction of the heat exchanger area for a given duty and at least partially achieves condensation by the system doing work.

Another object of this invention is to provide a process for desalinating seawater or brine and/or purifying water containing minerals, salts, and other dissolved solids, wherein work is withdrawn from the system rather than input into the system.

Another object of this invention is to provide a process for desalinating seawater or brine and/or purifying water containing minerals, salts, and other dissolved solids which eliminates the need for a second boiler commonly used in conventional dual purpose desalination/power plants and the efficiency of the power plant is not adversely affected by increasing the fresh water production rate.

A further object of this invention is to provide a process for desalinating seawater or brine and/or purifying water containing minerals, salts, and other dissolved solids, wherein the condensate produced is withdrawn as a saleable product, treated salinous water is fed to the boiler and liquid is continuously removed from the boiler to reduce scaling and prevent supersaturation by salt, and steam produced is washed by a stream of condensate to remove volatized salts.

A still further object of this invention is to provide a highly efficient process for desalinating seawater or brine and/or purifying water containing minerals, salts, and other dissolved solids, wherein a low pressure boiler operating at relatively lower temperatures is utilized for desalination in conjunction with a high pressure boiler for producing power.

Other objects of the invention will become apparent from time to time throughout the specification and claims as hereinafter related.

The above noted objects and other objects of the invention are accomplished by a process and apparatus for desalinating seawater or brine and purifying water containing minerals, salts, and other dissolved solids while simultaneously generating power. The salinous water is heated in a boiler to form steam and a concentrated brine. The concentrated brine is removed from the boiler, the steam produced in the boiler is washed with fresh water to remove trace salts and inorganic materials, and water bearing trace salts and inorganic materials is returned to the boiler. The washed steam is expanded across a turbine to generate electrical or mechanical power which is utilized as a product. The steam exhausted from the turbine is collected and condensed, and one portion of the condensed water is utilized as a fresh water product and another portion of the condensed water is used as the wash water to wash the steam produced in the boiler. Energy efficiency is improved by heat exchanging the hot concentrated brine against the salinous feed water or by flashing the brine to produce steam. Boiler scaling and corrosion may be controlled by feed water pretreatment. By utilizing distillation combined with power generation, demand for fresh water and power can be satisfied simultaneously. Efficiency is further improved by utilizing a low pressure boiler at lower temperatures for desalination in conjunction with a high pressure boiler for producing power.

DESCRIPTION OF THE PREFERRED EMBODIMENT

Figure 1:
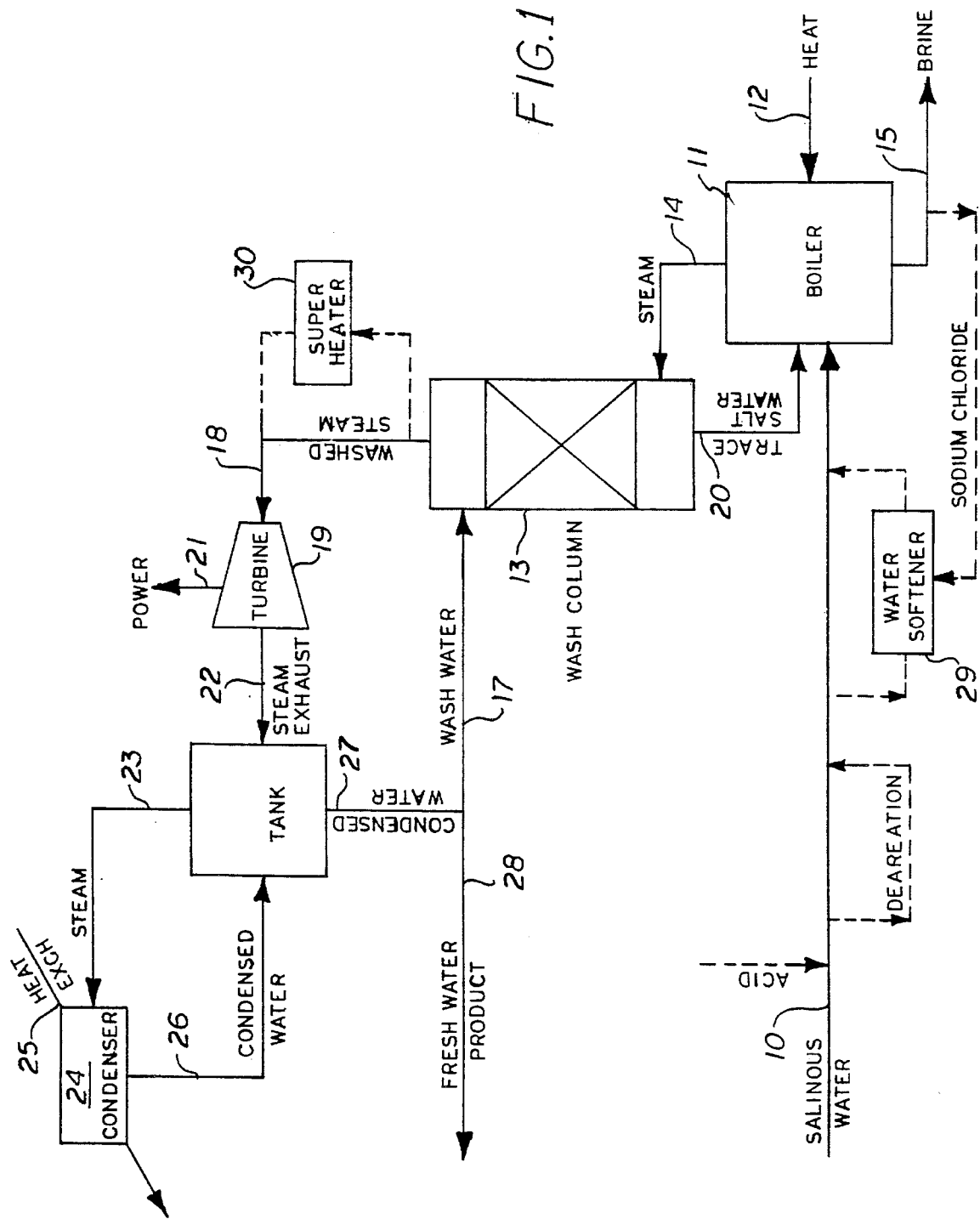
FIG. 1 is a schematic illustration of a preferred process and apparatus for desalinating seawater or brine and purifying fresh water which contains minerals, salts, and other dissolved solids while simultaneously generating power in accordance with the present invention.

Referring now to FIG. 1 of the drawings by numerals of reference, there is shown schematically, a preferred process for desalinating seawater or brine and purifying fresh water which contains minerals, salts, and other dissolved solids while simultaneously generating power. In the present process, condensed steam is removed as a product and saline water is used as boiler feed water. The process and apparatus described hereinafter overcomes the obstacles of corrosion, scaling, and steam contamination normally associated with the production of power from steam derived from salinous water.

As shown in the drawing, seawater is introduced via line 10 to a boiler 11. Heat from a heat exchanger (not shown) is added to the boiler 11 via line 12. The salinous water is heated in the boiler 11 to form steam and a concentrated brine. The steam is removed from the boiler 11 and fed to a wash column 13 via line 14 and the concentrated brine is removed from boiler via line 15. The concentration of dissolved solids within the boiler liquid is regulated by controlling the rate of blowdown removal.

Boiler operation should be maintained at conditions well below the critical point of water to ensure good phase separation. Brine concentration may be regulated by using a ratio cascaded flow control loop that controls the flow rate of exiting brine and that is actuated by the flow rate of boiler feed water. Sodium ion concentration within the boiler brine should be maintained at a value exceeding 100,000 ppm.

Fresh wash water is fed to the wash column 13 from a reservoir/accumulation tank 16 via line 17. Within the wash column 13, the fresh wash water introduced via line 17 and the steam introduced via line 14 are directly contacted. Therefore, any salts and inorganic materials contained within the steam are transferred into the water. Washed steam is removed from wash column 13 via line 18 and fed to a power-generating turbine 19. Water that contains trace salts and inorganic materials is removed from the wash column 13 via line 20 and recycled to the boiler 11.

To prevent corrosion resulting from chloride attack within the boiler 11, the boiler, the wash column 13 and the associated feed and removal lines are formed of corrosion resistant material, such as titanium, hastelloy, inconel, incoloy, or monel. Monel would be a preferred material due to its cost. However, if monel is used, dissolved ammonia must be excluded from the process fluids.

After entering the turbine 19 via line 18, the washed steam expands against the turbine thereby doing work or generating power which is removed via shaft 21. Steam that may be partially condensed exits turbine 19 via line 22 and enters the reservoir/accumulation tank 16. Steam is withdrawn from the reservoir/accumulation tank 16 via line 23 and fed to a condenser 24 where condensation takes place. Heat is removed from the condenser 24 via heat exchanger 25 and fresh water (condensate) is removed from the condenser via line 26 and recycled to the reservoir/accumulation tank 16. The fresh water (condensate) is removed from tank 16 via line 27 and is divided into product water and fresh wash water. The fresh wash water is recycled to the wash column 13 via line 17 and the fresh product water is withdrawn via line 28.

By washing the steam with condensate and thereby causing the contaminants to transfer into the liquid phase from the vapor phase, steam contamination as a result of slight volatizing of components such as chlorides, sulfates, and silicates, is effectively reduced.

As shown in dotted line, scaling as a result of precipitation of calcium carbonate within the boiler and associated equipment may be effectively prevented by adding acid to the salinous feed water followed by deareation to remove the carbonate and dissolved gases, and by ion exchange using conventional water softening devices 29 to remove the calcium and magnesium ions. By maintaining sodium ion concentration within the boiler brine at a value exceeding 100,000 ppm, favorable ion selectivity is ensured in the water softener.

The boiler 11 may also serve as the source of the concentrated sodium chloride solution used for resin regeneration by the water softener. Other water treatment programs may also be utilized to prevent scaling but may be more expensive. A biocide may also be added to the feed water.

Additional water treatment such as settling, filtration, addition of foaming inhibitors, addition of scaling inhibitors, and the addition of corrosion inhibitors may also be utilized in the present process.

A superheater 30 may be installed between the wash column 13 and the turbine 19 to superheat the washed steam and prolong turbine life.

The boiler 11, the wash column 13, power-generating turbine 19, the reservoir/accumulation tank 16, the condenser 24, and the associated conduit, lines, and fittings may also be insulated such that the system operates adiabatically and thus further conserves energy. Material costs may also be reduced by utilizing cladding wherein two dissimilar layers of metals are used in fabrication. For example, carbon steel may be used on the fire side of the boiler and an exotic layer such as hastelloy may be used as cladding on the brine side of the boiler.

Figure 2:
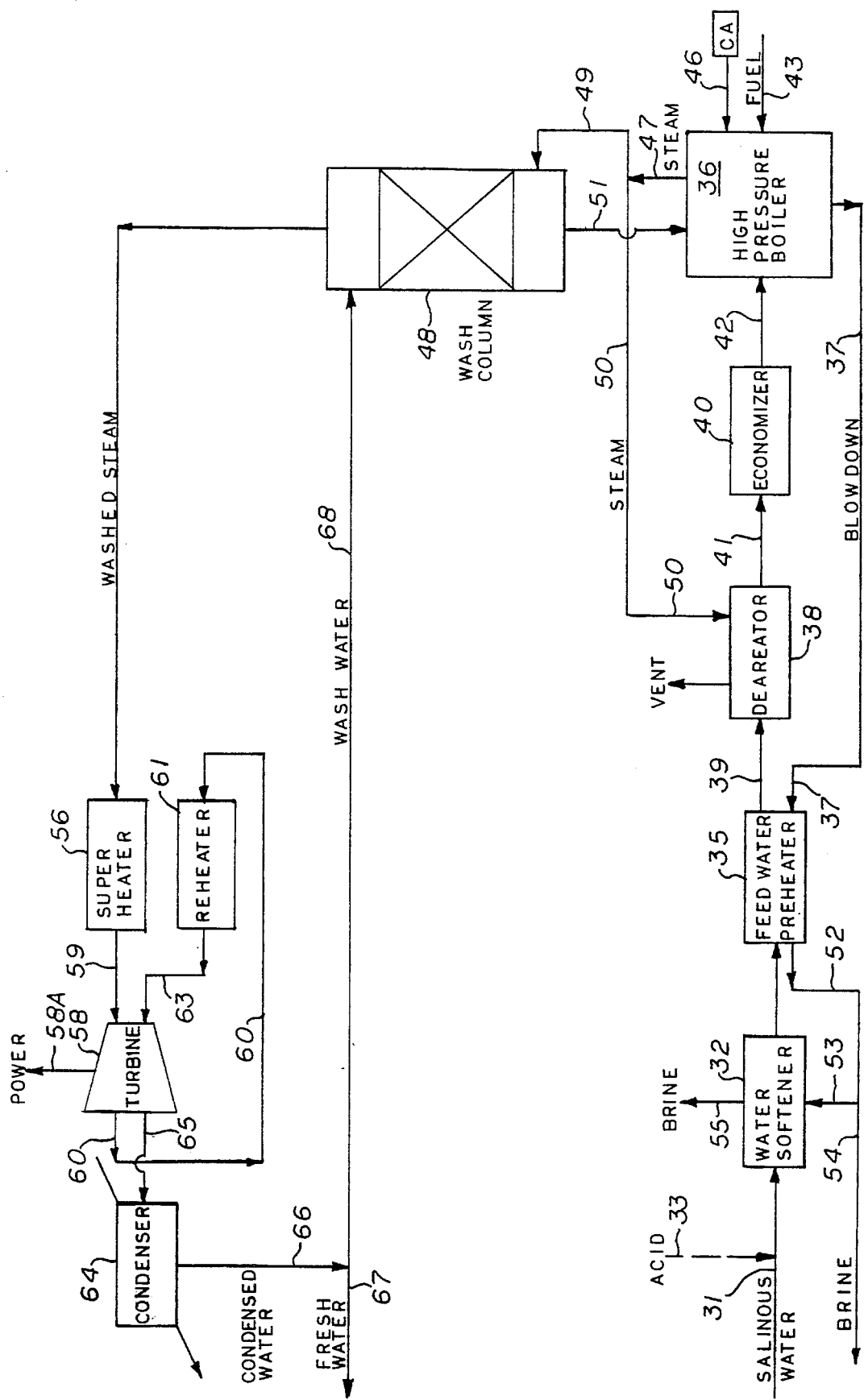
FIGS. 2 and 2A are schematic illustrations of a modification of the process utilizing an economizer and high pressure boiler arrangement in the system.
Figure 2A:
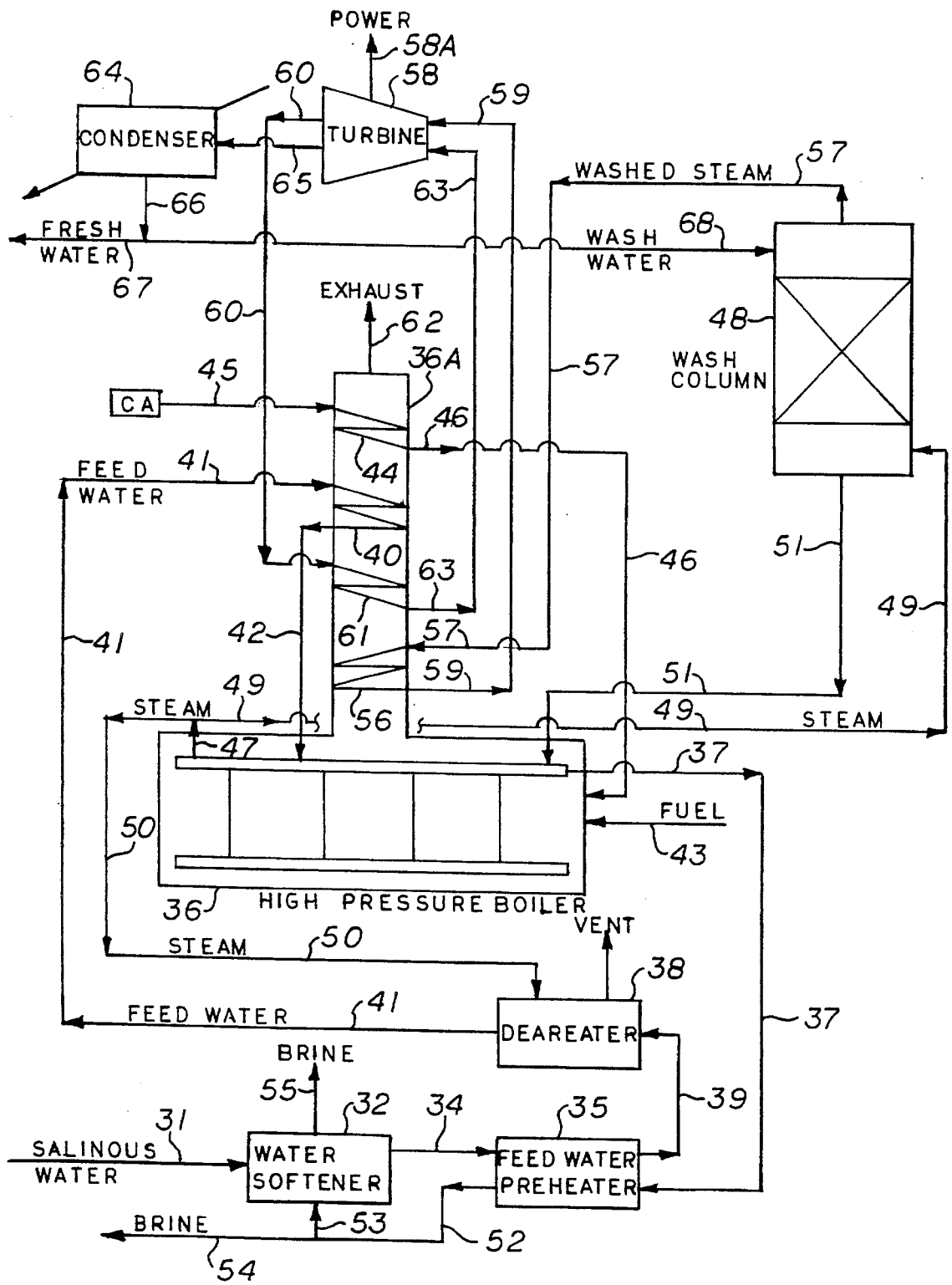

Referring now to FIGS. 2 and 2A, there is shown schematically, a modification of the process described above which utilizes a feed water economizer, air heater, steam superheater, steam reheater, and a high pressure boiler arrangement in the system. FIG. 2 illustrates schematically the basic flow diagram for the process and FIG. 2A is a more detailed schematic illustration of the flow arrangement and heat exchange process in the stack of the high pressure boiler. In FIG. 2A, the feed water economizer 40, air heater 44, steam superheater 56, and steam reheater 61 heat exchangers are shown as conduits in the stack, and in FIG. 2, some of these components are represented by labelled boxes.

As shown in FIGS. 2 and 2A, seawater or salinous water is introduced via line 31 to a water softener 32 where scale causing minerals, such as calcium and magnesium are exchanged for sodium. Acid may also be fed into the water via line 33 to destroy contaminants (FIG. 2). The soft water is then fed by line 34 to a feed water preheater 35 where waste sensible heat is recovered from the blowdown from the high pressure boiler 36. The blowdown from the high pressure boiler 36 is fed to the preheater 35 via line 37. The high pressure boiler blowdown provides preheating.

Heated feed water from the preheater 35 is fed to a deareator 38 via line 39 which removes carbon dioxide and dissolved oxygen. As shown in FIG. 2A, the heated feed water from the deareator 38 is fed to the economizer portion 40 of the stack 36A of the high pressure boiler 36 through line 41 and is routed from the economizer 40 to the high pressure boiler 36 through line 42.

A fuel such as natural gas or fuel oil is fed to the firebox of the high pressure boiler 36 through line 43. Combustion air CA is fed through a preheater portion 44 of the high pressure boiler stack 36A through line 45 and is routed through line 46 to the firebox of the high pressure boiler 36. Steam is removed from the boiler 36 via line 47 and a portion is routed to the wash column 48 via line 49 and another portion of the steam is routed to the deareator 38 via line 50 and is used to control the temperature of the preheated feed water. Water that contains trace salts and inorganic materials is removed from the wash column 48 via line 51 and recycled to the boiler 36.

As described above, brine (blowdown) is removed from the boiler 36 via line 37 and is routed to the preheater 35 where the sensible heat from the brine is used to preheat the boiler feed water. Cooled brine exits the preheater 35 via line 52 and is divided into two streams. One portion of the cooled brine is fed via line 53 to the water softener 32 to serve as a source of concentrated NaCl to regenerate the resin of the water softener. The other portion of the cooled brine is removed as a product via line 54. Brine may also be removed from the water softener via line 55.

Washed steam is carried from the wash column 48 to the superheater portion 56 of the stack 36A via line 57 and the superheated steam is carried from the superheater 56 to the high pressure part of the turbine 58 through line 59. The superheated steam expands against the turbine 58 and passes via line 60 to the reheater portion 61 of the stack 36A where it is reheated by combustion exhaust 62 and then routed to the low pressure part of the turbine 58 via line 63. The reheated steam expands again against the turbine 58 and is routed to the condenser 64 via line 65. Power is generated as the high pressure steam and reheated steam expands against the turbine, and is removed via shaft 58A. Combustion exhaust 62 leaves the stack 36A after being cooled by heat exchange against the feed water economizer 40, air heater 44, steam superheater 56, and steam reheater 61 conduits in the stack 36A.

Condensed water is removed from the condenser 64 via line 66. A portion of the condensate is utilized as a fresh water product 67 and another portion of the condensate is sent to the wash column 48 through line 68 to be used as wash water.

Figure 3:
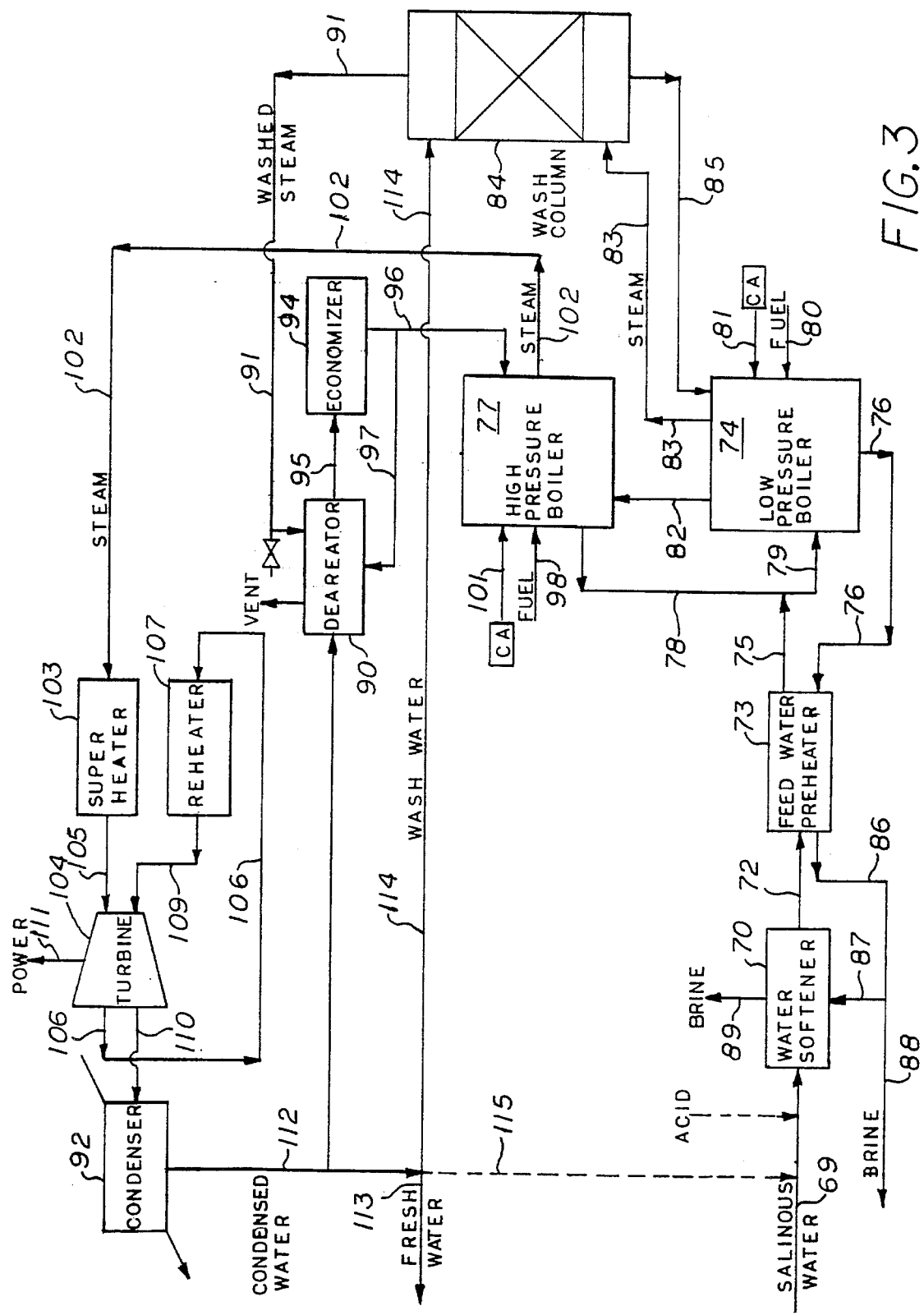
FIGS. 3 and 3A are schematic illustrations of another modification of the process utilizing an economizer, a low pressure boiler and a high pressure boiler arrangement in the system wherein the low pressure boiler operating at lower temperatures is utilized for desalination in conjunction with a high pressure boiler for producing power.
Figure 3A:
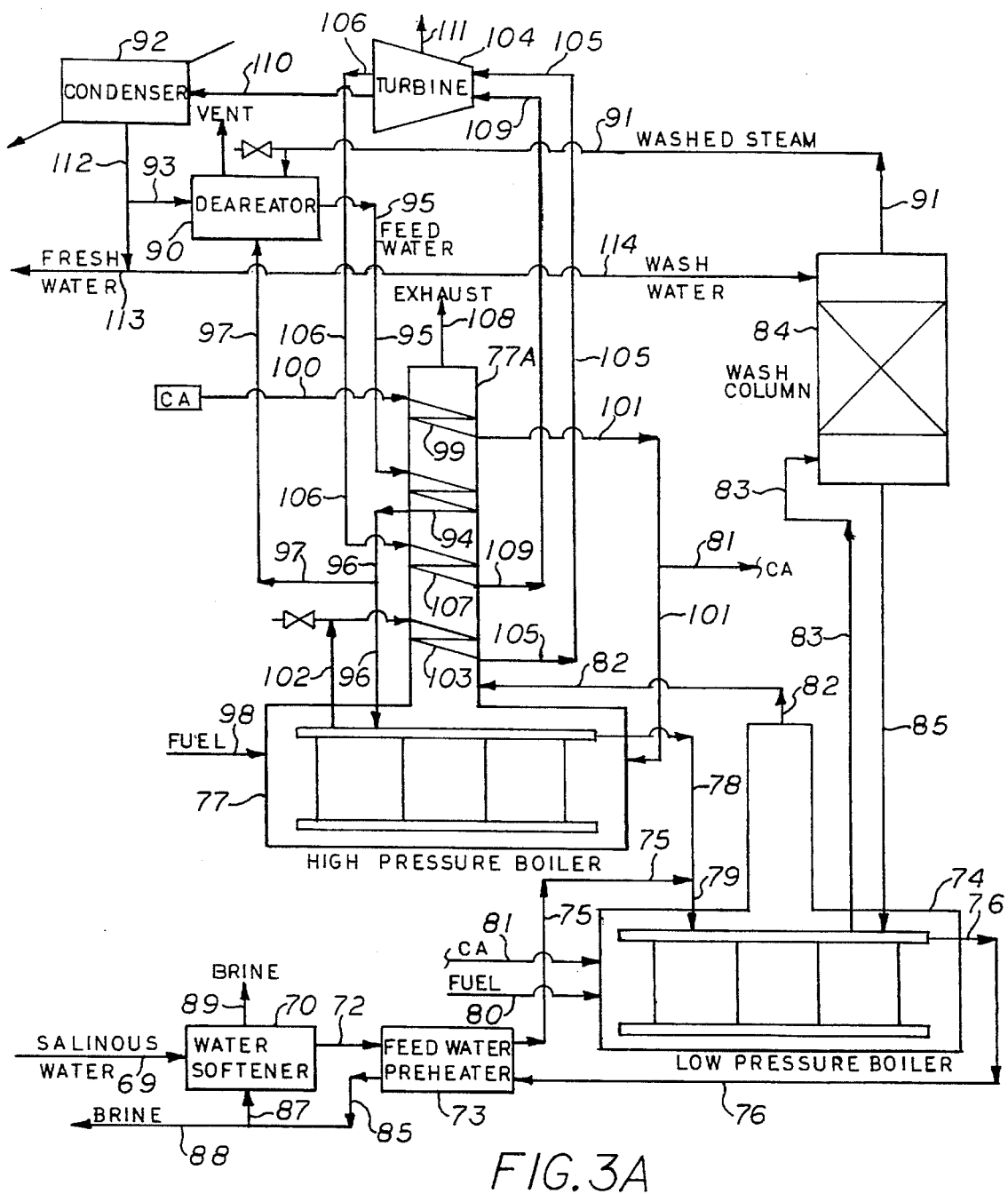

Referring now to FIGS. 3 and 3A, there is shown schematically, another modification of the process described above which utilizes a feed water economizer, air heater, steam superheater, steam reheater, a low pressure boiler, and a high pressure boiler arrangement in the system. The low pressure boiler operating at, for example 50 psig., is used in conjunction with a high pressure boiler to produce electrical power, fresh water and brine. Desalination is performed in the low pressure boiler at a temperature well below that of the previously described processes. Using the low pressure boiler and lower temperature for desalination results in reduced corrosion, reduced scaling, and reduced volitizing of salts and hence less steam contamination.

FIG. 3 illustrates schematically the basic flow diagram for the process and FIG. 3A is a more detailed schematic illustration of the flow arrangement and heat exchange process in the stack of the high pressure boiler. In FIG. 3A, the feed water economizer 94, air heater 99, steam superheater 103, and steam reheater 107 heat exchangers are shown as conduits in the stack, and in FIG. 3, some of these components are represented by labelled boxes.

As shown in FIGS. 3 and 3A, seawater or salinous water is introduced via line 69 to a water softener 70 where scale causing minerals, such as calcium and magnesium are exchanged for sodium. Acid may also be fed into the water via line 71 to destroy contaminants (FIG. 3). The soft water is then fed by line 72 to a feed water preheater 73 where waste sensible heat is recovered from the blowdown (brine) from the low pressure boiler 74. The heated feed water from the preheater 73 is fed to the low pressure boiler 74 via line 75.

Optionally, a deareator (not shown) may be placed between the preheater 73 and the low pressure boiler 74, as previously described and shown as 38 in FIG. 2, to remove carbon dioxide and dissolved oxygen.

The blowdown (brine) from the low pressure boiler 74 is fed to the feed water preheater 73 via line 76. The blowdown from the high pressure boiler 77 is fed to the low pressure boiler 74 via line 78. The high pressure boiler blowdown provides additional preheating and typically contains a trace amount of useful treating chemicals, such as sulfite and phosphate. The combined heated feed water from the preheater 73 (line 75) and the blowdown from the high pressure boiler 77 (line 78) is fed to the low pressure boiler 74 via line 79. It is preferred that the high pressure boiler blowdown (78) not be fed directly to the low pressure boiler 74, since the high pressure blowdown could flash and cause two-phase flow in line 78 and mixing problems within the low pressure boiler.

A fuel such as natural gas or fuel oil enters the firebox of the low pressure boiler 74 through line 80 and preheated combustion air CA enters the low pressure boiler through line 81. Combustion exhaust leaves the low pressure boiler 74 through line 82 and is routed to the heat recovery section of the stack 77A of the high pressure boiler 77 (FIG. 3A).

Steam is removed from the low pressure boiler 74 via line 83 and routed to the wash column 84. Water that contains trace salts and inorganic materials is removed from the wash column 84 via line 85 and recycled to the low pressure boiler 74. Brine is removed from the low pressure boiler 74 via line 76 and is routed to the preheater 73 where the sensible heat from the brine is used to preheat the low pressure boiler feed water, as previously described. Cooled brine exits the preheater 73 via line 86 and is divided into two streams. One portion of the cooled brine is fed via line 87 to the water softener 70 to serve as a source of concentrated NaCl to regenerate the resin of the water softener. The other portion of the cooled brine is removed as a product via line 88. Brine may also be removed from the water softener via line 89.

Washed steam is carried from the wash column 84 to the deareator 90 of the high pressure boiler 77 via line 91. A portion of the condensate from the condenser 92 is brought into the deareator 90 through line 93. Boiler feed water is routed from the deareator 90 to the economizer 94 through line 95. Preheated boiler feed water exits the economizer 94 and is routed to the high pressure boiler 77 through line 96. A portion of the preheated boiler feed water from the economizer 94 is recycled to the deareator 90 through line 97 and is used to control the temperature of the preheated feed water and to insure good thermal recovery in the stack 77A of the high pressure boiler 77.

A fuel such as natural gas or fuel oil is fed to the firebox of the high pressure boiler 77 through line 98. Combustion air CA is fed through a preheater portion 99 of the high pressure boiler stack 77A through line 100 and exits through line 101 and is fed to the firebox of the high pressure boiler 77 (FIG. 3A). A portion of the heated combustion air CA from the preheater 99 may be routed through line 81 to the low pressure boiler 74 and utilized for combustion. Blowdown liquid is removed from the high pressure boiler 77 via line 78 and combined with the heated feed water from the preheater 73 (line 75) and the mixture is fed to the low pressure boiler 74 via line 79, as described previously.

As shown in FIG. 3A, high pressure steam is removed from the high pressure boiler 77 through line 102 and enters the superheater portion 103 of the stack 77A and the superheated steam is carried from the superheater 103 to the high pressure part of the turbine 104 through line 105. The superheated steam expands against the turbine 104 and passes via line 106 to the reheater portion 107 of the stack 77A where it is reheated by combustion exhaust 108 and then routed to the low pressure part of the turbine 104 via line 109. The reheated steam expands again against the turbine 104 and is routed to the condenser 92 via line 110. Power is generated as the high pressure steam and reheated steam expands against the turbine, and is removed via shaft 111. Combustion exhaust 108 leaves the stack 77A after being cooled by heat exchange against the feed water economizer 94, air heater 99, steam superheater 103, and steam reheater 107 conduits in the stack.

Condensed water is removed from the condenser via line 112. A portion of the condensate is utilized as a fresh water product 113 and another portion of the condensate is sent to the wash column 84 through line 114 to be used as wash water. As previously described, another portion of the condensate is routed to the deareator 90 of the high pressure boiler 77 through line 93. As shown in dotted line in FIG. 3A, condensate may also be routed to the low pressure boiler 74 via line 115 when desalination is not required or when only power generation is desired.

By utilizing low pressure steam (e.g. 50 psig.) produced by the low pressure boiler for preheating the feed water for the high pressure boiler, it may be possible to effectively increase the capacity of the high pressure boiler by approximately 8% to 12%. This reduces the capital cost of new installations and provides a cost effective means of increasing the capacity of existing installations, irrespective of utilizing the low pressure boiler for desalination.

By performing desalination at low pressure, corrosion, scaling, and volitizing of salts is reduced and hence less steam contamination. For example, the corrosion rate of Alloy 20 materials would be less than 2 mils per year under these conditions. Other materials of construction such as 90-10 cupro-nickle, Monel, and high silicon iron also have satisfactory corrosion rates under these conditions. Glass may also be a suitable material in systems operating in the range of 25–50 psig.

While this invention has been described fully and completely with special emphasis upon a preferred embodiment, it should be understood that within the scope of the appended claims the invention may be practiced otherwise than as specifically described herein.

We claim:

1. A process for desalinating seawater or brine and purifying water containing minerals, salts, and dissolved solids while simultaneously generating power, comprising the steps of;

introducing salinous water or water containing minerals, salts, and dissolved solids into a boiler and boiling it to produce steam and concentrated brine, removing the concentrated brine from the boiler, feeding the steam produced in the boiler to a wash column, introducing fresh wash water into the steam in the wash column to wash the steam such that it is substantially free of trace salts, minerals, and dissolved solids, and the trace salts, minerals, and dissolved solids are transferred to the water in the wash column, removing the water bearing trace salts, minerals, and dissolved solids from the wash column, superheating said washed steam and expanding it across a steam-operated power generating turbine to generate power, reheating said washed steam after expanding it across said turbine a first time and thereafter expanding it across said turbine a second time and utilizing the generated power as a product, and collecting and condensing the steam exhausted from the turbine and utilizing it as a fresh water product.

2. The process according to claim 1 including the further step of;

separating said condensed steam exhausted from said turbine, and utilizing one portion of the condensate collected from the turbine as a fresh water product, and returning another portion of the condensate to said wash column to be used as the fresh wash water to wash said steam produced in said boiler to remove trace salts, minerals, and dissolved solids.

3. The process according to claim 1 including the step of adding acid to said salinous water or water containing minerals, salts, and dissolved solids introduced into said boiler to reduce scaling as a result of precipitation of calcium carbonate within said boiler.

4. The process according to claim 1 including the step of deareating the salinous water or water containing minerals, salts, and dissolved solids introduced into the boiler to remove carbonate and dissolved gases.

5. The process according to claim 1 including the steps of adding acid to said salinous water or water containing minerals, salts, and dissolved solids and deareating it prior to introducing it into said boiler to reduce scaling as a result of precipitation of calcium carbonate within said boiler, and to remove carbonate and dissolved gases.

6. The process according to claim 1 including the steps of softening said salinous water or water containing minerals, salts, and dissolved solids prior to introducing it into the boiler by ion exchange to remove calcium and magnesium ions.

7. The process according to claim 1 including the steps of softening said salinous water or water containing minerals, salts, and dissolved solids prior to introducing it into said boiler by ion exchange to remove calcium and magnesium ions, and utilizing concentrated sodium chloride from the brine removed from said boiler for resin regeneration in said water softening step.

8. The process according to claim 1 including the step of adding a biocide to said salinous water or water containing minerals, salts, and dissolved solids prior to introducing it into said boiler.

9. The process according to claim 1 including the step of utilizing said brine removed from said boiler for preheating said salinous water or water containing minerals, salts, and dissolved solids prior to introducing it into said boiler.

10. The process according to claim 1 including the steps of deareating said salinous water or water containing minerals, salts, and dissolved solids introduced into said boiler to remove carbonate and dissolved gases, separating the steam produced in the boiler, feeding one portion of said separated steam to said wash column, and utilizing another portion of said separated steam for deareating said salinous water or water containing minerals, salts, and dissolved solids.

11. The process according to claim 1 including the step of utilizing combustion heat exhausted from said boiler to preheat air introduced into said boiler for combustion.

12. The process according to claim 1 including the steps of mixing said washed steam with feed water prior to expanding said washed steam across said turbine, introducing said washed steam and feed water mixture into a second boiler operating at a higher temperature and pressure than said first recited boiler and boiling it to produce steam, removing blowdown liquid from said second boiler, expanding the steam produced by said second boiler across said steam-operated power generating turbine to generate power and utilizing the generated power as a product, and separating said collected and condensed steam exhausted from said turbine and utilizing a portion of it as feed water for said second boiler.

13. The process according to claim 12 including the steps of introducing combustion heat exhausted from said first recited boiler into said second boiler.

14. The process according to claim 12 including the steps of after removing blowdown liquid from said second boiler, mixing it with said salinous water or water containing minerals, salts, and dissolved solids, and introducing the mixture into said first recited boiler.

15. The process according to claim 12 including the step of superheating said steam produced by said second boiler prior to expanding it across said turbine.

16. The process according to claim 15 including the steps of reheating said steam produced by said second boiler after superheating it and expanding it across said turbine a first time and thereafter expanding it across said turbine a second time.

17. The process according to claim 12 including the step of deareating said feed water prior to introducing it into said second boiler to remove dissolved gases.

18. The process according to claim 12 including the steps of deareating said feed water prior to introducing it into said second boiler to remove dissolved gases, utilizing combustion heat exhausted from said second boiler to preheat said feed water, separating said feed water prior to introducing it into said second boiler, feeding one portion of said separated feed water to said second boiler, and utilizing another portion of said separated feed water to control the temperature of said second boiler feed water.

19. A process for desalinating seawater or brine and purifying water containing minerals, salts, and dissolved solids while simultaneously generating power, comprising the steps of;

introducing salinous water or water containing minerals, salts, and dissolved solids into a first boiler and boiling it to produce steam and concentrated brine, removing the concentrated brine from said first boiler, feeding the steam produced in said first boiler to a wash column, introducing fresh wash water into the steam in the wash column to wash the steam such that it is substantially free of trace salts, minerals, and dissolved solids, and the trace salts, minerals, and dissolved solids are transferred to the water in the wash column, removing the water bearing trace salts, minerals, and dissolved solids from the wash column, introducing combustion heat exhausted from said first boiler into a second boiler operating at a higher temperature and pressure than said first boiler, mixing said washed steam with feed water and introducing said washed steam and feed water mixture into said second boiler and boiling it to produce steam, removing blowdown liquid from said second boiler, expanding the steam produced by said second boiler across a steam-operated power generating turbine to generate power and utilizing the generated power as a product, collecting and condensing the steam exhausted from said turbine; and separating said collected and condensed steam exhausted from said turbine and utilizing a portion of it as said feed water mixed with said washed steam and introduced into said second boiler.

20. The process according to claim 19 including the steps of after removing blowdown liquid from said second boiler, mixing it with said salinous water or water containing minerals, salts, and dissolved solids, and introducing the mixture into said first boiler.

21. The process according to claim 19 including the step of superheating said steam produced by said second boiler prior to expanding it across said turbine.

22. The process according to claim 21 including the steps of reheating said steam produced by said second boiler after superheating it and expanding it across said turbine a first time and thereafter expanding it across said turbine a second time.

23. The process according to claim 19 including the step of deareating said feed water prior to introducing it into said second boiler to remove dissolved gases.

24. The process according to claim 19 including the steps of deareating said feed water prior to introducing it into said second boiler to remove dissolved gases, utilizing combustion heat exhausted from said second boiler to preheat said feed water, separating said feed water prior to introducing it into said second boiler, feeding one portion of said separated feed water to said second boiler, and utilizing another portion of said separated feed water to control the temperature of said second boiler feed water.

* * * * *